United States Patent
Furuki

(10) Patent No.: US 6,998,815 B2
(45) Date of Patent: Feb. 14, 2006

(54) MOTOR DRIVE CONTROL DEVICE

(75) Inventor: Shigeru Furuki, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/145,642

(22) Filed: Jun. 6, 2005

(65) Prior Publication Data

US 2005/0276581 A1 Dec. 15, 2005

(30) Foreign Application Priority Data

Jun. 14, 2004 (JP) .............................. 2004-175785

(51) Int. Cl.
*H02P 5/28* (2006.01)
(52) U.S. Cl. ...................... 318/811; 318/599; 318/254; 318/138; 318/432; 318/439
(58) Field of Classification Search ................ 318/138, 318/254, 439, 432–434, 599, 811, 727
See application file for complete search history.

(56) References Cited

U.S. PATENT DOCUMENTS

| | | | | |
|---|---|---|---|---|
| 4,319,170 A | * | 3/1982 | Brent | 318/376 |
| 4,710,686 A | * | 12/1987 | Guzik | 318/293 |
| 5,574,344 A | * | 11/1996 | Matsuoka et al. | 318/293 |
| 5,764,009 A | * | 6/1998 | Fukaya et al. | 318/300 |
| 6,342,772 B1 | * | 1/2002 | Gallegos-Lopez et al. | 318/701 |
| 6,434,020 B1 | * | 8/2002 | Lambert et al. | 363/17 |
| 6,854,352 B1 | | 2/2005 | Onodera et al. | |

FOREIGN PATENT DOCUMENTS

| | | |
|---|---|---|
| JP | 6-237591 | 8/1994 |
| JP | 11-215876 | 8/1999 |
| JP | 11-243696 | 9/1999 |

* cited by examiner

*Primary Examiner*—Rina Duda
(74) *Attorney, Agent, or Firm*—Brinks Hofer Gilson & Lione

(57) ABSTRACT

A motor drive control apparatus includes a motor, a power supply, a control circuit, a first current detector, a first switching element, and a second switching element. The first current detector generates a first detection voltage indicating a first current flowing through the motor in one direction. The control circuit generates a PWM voltage and generates an ON voltage if the first detection voltage is lower than or equal to a first specified input voltage, and the control circuit generates an OFF voltage and generates the PWM voltage if the first detection voltage is higher than the first specified input voltage to adjust a pulse duty of the PWM voltage in accordance with a difference voltage between the first detection voltage and the first specified input voltage and to control the current flowing through the motor so as to be equal to a target current.

3 Claims, 4 Drawing Sheets

| ELEMENT STATE | ELEMENT 1 | ELEMENT 2 | ELEMENT 3 | ELEMENT 4 |
|---|---|---|---|---|
| $V_i \geq V_{F2}$ | PWM | OFF | OFF | ON |
| $V_i < V_{F2}$ | OFF | OFF | OFF | PWM |
| $V_i \geq V_{F1}$ | OFF | ON | PWM | OFF |
| $V_i < V_{F1}$ | OFF | PWM | OFF | OFF |

MOTOR DRIVE CONTROL DEVICE

BACKGROUND OF THE INVENTION

1. Field of the Invention

The present invention relates to motor drive control apparatuses. Particularly, the present invention relates to a motor drive control apparatus that is suitable for an input apparatus with a function of giving a force sense, which input apparatus couples a manual operation member to the axis of rotation of the motor to give the force sense to the operation member, and that is capable of suppressing the motor torque involved in an increase in current, flowing through the motor, based on the electromotive force of the motor when the operation member is manually operated to rotate the motor.

2. Description of the Related Art

Hitherto, motor drive control apparatuses that rotate direct current (DC) motors in both directions use motor drive circuits each having four switching elements connected to each other to form a bridge circuit. In the bridge circuit, a first switching element is connected in series to a third switching element between a power supply and a reference voltage point, a second switching element is connected in series to a fourth switching element between the power supply and the reference voltage point, and a DC motor is connected between the connection point between the first and third switching elements and the connection point between the second and fourth switching elements. The first and third switching elements are connected in parallel to the second and fourth switching elements. The first to fourth switching elements and the DC motor form an H-bridge circuit. In order to rotate the DC motor in a positive (one) direction, the first and fourth switching elements are turned on and the second and third switching elements are turned off. In contrast, in order to rotate the DC motor in a negative (the other) direction, the first and fourth switching elements are turned off and the second and third switching elements are turned on.

Various motor drive circuits using the H-bridge circuits are known. Examples of the motor drive circuits are disclosed in, for example, Japanese Unexamined Patent Application Publication No. 11-243696, Japanese Unexamined Patent Application Publication No. 11-215876, and Japanese Unexamined Patent Application Publication No. 06-237591. An input apparatus with a function of giving a force sense is disclosed in, for example, Japanese Unexamined Patent Application Publication No. 2003-22159 (corresponding to U.S. Pat. No. 6,854,352).

FIG. 4 is a circuit diagram showing the configuration of a motor drive circuit disclosed in Japanese Unexamined Patent Application Publication No. 11-243696.

In the motor drive circuit shown in FIG. 4, a first pair of switching elements 41 and 42 connected in series to a power supply 47, a second pair of switching elements 43 and 44 connected in series to the power supply 47, and a DC motor 45 and a current sensor 46 that are connected in series between the connection point between the switching elements 41 and 42 and the connection point between the switching elements 43 and 44 form an H-bridge circuit. The H-bridge circuit is provided with a driving unit including a controller 48 that outputs a driving signal, a pulse width modulation (PWM) signal, and a rotation direction signal, and a first AND gate 49, an inverter 50, a second AND gate 51, and a third AND gate 52 that electively supply the driving signal, the PWM signal, and the rotation direction signal to the first to fourth switching elements 41 to 44.

The motor drive circuit having the configuration in FIG. 4 operates in the following manner. In order to rotate the DC motor 45 in the positive direction, the controller 48 outputs a high-level rotation direction signal and a high-level driving signal. The switching elements 41 and 44 are tuned on and the switching elements 42 and 43 are tuned off to apply a current from the switching element 41 to the switching element 44 through the DC motor 45. This current serves as a current for rotating the DC motor 45 in the positive direction. In contrast, in order to rotate the DC motor 45 in the negative direction, the controller 48 outputs a low-level rotation direction signal and a high-level driving signal. The switching elements 41 and 44 are turned off and the switching elements 42 and 43 are turned on to apply a current from the switching element 43 to the switching element 42 through the DC motor 45. This current serves as a current for rotating the DC motor 45 in the negative direction. When the controller 48 outputs the PWM signal with the DC motor 45 rotating in the positive or negative direction, the average positive current for the DC motor 45, flowing through the switching element 42, is varied with the pulse duty indicating the on-off ratio of the PWM signal or the average negative current for the DC motor 45, flowing through the switching element 44, is varied with the pulse duty. The pulse duty of the PWM signal is controlled such that the average positive or negative current is equal to a target current.

FIG. 5 is a circuit diagram showing the configuration of a motor drive circuit disclosed in Japanese Unexamined Patent Application Publication No. 11-215876.

In the motor drive circuit shown in FIG. 5, a first pair of switching elements 61 and 62 connected in series between a power supply 66 and a ground point, diodes 61D and 62D connected in parallel to the switching elements 61 and 62, respectively, a second pair of switching elements 63 and 64 connected in series between the power supply 66 and the ground point, diodes 63D and 64D connected in parallel to the switching elements 63 and 64, respectively, and a DC motor 65 connected between the connection point between the switching elements 61 and 62 and the connection point between the switching elements 63 and 64 form an H-bridge circuit. The H-bridge circuit is provided with a driving unit including four switching-element drive circuits 67, 68, 69, and 70 and two OR circuits 71 and 72.

The motor drive circuit having the configuration in FIG. 5 operates in the following manner. In order to rotate the DC motor 45 rightward (in the positive direction), a control unit (not shown) outputs a right PWM instruction, stops the output of a left PWM instruction, and outputs a driving-direction switching signal. When the driving-direction switching signal is in a low level and the right PWM instruction is in a high level, the switching elements 61 and 64 are turned on and the switching elements 62 and 63 are turned off to apply a current IM to the DC motor 45 and to rotate the DC motor 45 rightward. When the right PWM instruction is in the low level, all the switching elements 61 to 64 are turned off to apply no current to the DC motor 45 and to stop the rotation of the DC motor 45. When the driving-direction switching signal is in the high level, the switching element 61 is turned on or off as the right PWM instruction is changed to the high level or low level, the switching element 64 is turned on regardless of the level of the right PWM instruction, and the remaining switching elements 62 and 63 are turned off. The current IM flows through the DC motor 45 to rotate the DC motor 45 rightward. When the right PWM instruction is in the low level, the free-wheeling diode 61D is turned on to apply the current MI through the DC motor 45 along a path indicated by a broken line and to rotate the DC motor 45 rightward. In contrast, when the control unit outputs the left PWM instruction and stops the output of the right PWM instruction, the current IM flows through the DC motor 45 in a manner substantially similar to the manner described above to rotate the DC motor 45 leftward.

FIG. 6 is a circuit diagram showing the configuration of a motor drive circuit disclosed in Japanese Unexamined Patent Application Publication No. 06-237591.

In the motor drive circuit shown in FIG. 6, a first pair of switching elements 81 and 82 and a current detection resistor 86 which are connected in series between a power supply 87 and a ground point, a second pair of switching elements 83 and 84 and the current detection resistor 86 which are connected in series between the power supply 87 and the ground point, and a DC motor 85 connected between the connection point between the switching elements 81 and 82 and the connection point between the switching elements 83 and 84 form an H-bridge circuit.

The motor drive circuit having the configuration in FIG. 6 operates in the following manner. In order to rotate the DC motor 85 in the positive direction, a control unit (not shown) supplies a high-level signal to the switching element 81, low-level signals to the switching elements 82 and 83, and a PWM signal to the switching element 84. When the PWM signal is in the high level, the switching elements 81 and 84 are turned on and a current is applied from the switching element 81 to the switching element 84 through the DC motor 85 to rotate the DC motor 85 in the positive direction. When the PWM signal is in the low level, no current is applied to the DC motor 85 to stop the rotation of the DC motor 85. In order to rotate the DC motor 85 in the negative direction, the control unit supplies the low-level signals to the switching elements 81 and 84, the high-level signal to the switching element 82, and the PWM signal to the switching element 83. When the PWM signal is in the high level, the switching elements 82 and 83 are turned on and a current is applied from the switching element 83 to the switching element 82 through the DC motor 85 to rotate the DC motor 85 in the negative direction. When the PWM signal is in the low level, no current is applied to the DC motor 85 to stop the rotation of the DC motor 85.

Each of the known motor drive circuits described above uses the PWM signal as a drive signal so as to drive the DC motor by using a constant current and attempts to cause the average driving current of the DC motor to be near to a target driving current by varying the pulse duty indicating the ratio of the high level of the PWM signal to the low level thereof. When the electromotive force of the DC motor is large, the current caused by the electromotive force is added to the average driving current, and the total current of the DC motor exceeds the control range of the pulse duty of the PWM signal, a driving current larger than the target driving current flows through the DC motor even when the ratio of the high level of the PWM signal to the low level thereof is set to 0%, or the PWM signal is always set to the low level, and, thus, the DC motor cannot be driven by using the constant current.

Particularly, when the DC motor is used for giving the force sense to an operation member, the above problem becomes noticeable. The force sense means the sense of force, such as a sense of click, which an operator receives via the operation member. The force sense is caused by, for example, a drag against the movement of the operation member at a predetermined position of the operation member, which drag is caused by controlling the DC motor coupled to the operation member. Since the operation member is moved simultaneously with the provision of the force sense when the operation member is manually operated, the DC motor is also driven to generate the electromotive force. When the electromotive force exceeds the target driving current, a current corresponding to the surplus electromotive force flows through the DC motor even with the pulse duty being set to 0% and, therefore, the torque corresponding to the flowing current is generated and the operator senses this torque. Since the electromotive force of the DC motor is varied with the operation speed by the operator and/or the characteristics of the DC motor, a constant force sense, for example, uniform motor torque, cannot be provided. As a result, the operator cannot obtain a superior operation sense.

SUMMARY OF THE INVENTION

The present invention provides a motor drive control apparatus capable of always controlling the driving current for a motor, including the current involved in the electromotive force of the motor, so as to be equal to a target driving current.

According to an aspect of the present invention, a motor drive control apparatus includes a motor, a power supply, a control circuit, a first current detector, a first switching element, and a second switching element. A first main electrode of the first switching element is connected to the power supply and a second main electrode thereof is connected to one end of the motor. A first control voltage is supplied from the control circuit to a control electrode of the first switching element. A first main electrode of the second switching element is connected to the other end of the motor and a second main electrode thereof is connected to a reference voltage point via the first current detector. A second control voltage is supplied from the control circuit to a control electrode of the second switching element. The first current detector generates a first detection voltage indicating a first current flowing through the motor in one direction. The first detection voltage and a first specified input voltage are applied to the control circuit. The control circuit generates a PWM voltage as one of the first control voltage and the second control voltage and generates an ON voltage, which is turned on at least during an ON period of the PWM voltage, as the other voltage of the first control voltage and the second control voltage, if the first detection voltage is lower than or equal to the first specified input voltage, and the control circuit generates an OFF voltage as the first control voltage and generates the PWM voltage as the second control voltage, if the first detection voltage is higher than the first specified input voltage, to adjust a pulse duty of the PWM voltage in accordance with a difference voltage between the first detection voltage and the first specified input voltage and to control the current flowing through the motor so as to be equal to a target current.

The motor drive control apparatus may include a second current detector, a third switching element, and a fourth switching element. A first main electrode of the third switching element is connected to the power supply and a second main electrode thereof is connected to the other end of the motor. A third control voltage is supplied from the control circuit to a control electrode of the third switching element. A first main electrode of the fourth switching element is connected to one end of the motor and a second main electrode thereof is connected to the reference voltage point via the second current detector. A fourth control voltage is supplied from the control circuit to a control electrode of the fourth switching element. The second current detector generates a second detection voltage indicating a second current flowing through the motor in the other direction. The second detection voltage and a second specified input voltage are applied to the control circuit. The control circuit generates the PWM voltage as one of the third control voltage and the fourth control voltage and generates the ON voltage, which is turned on at least during the ON period of the PWM voltage, as the other voltage of the third control voltage and the fourth control voltage, if the second detection voltage is lower than or equal to the second specified input voltage, and the control circuit generates the OFF voltage as the third control voltage and generates the PWM voltage as the fourth control voltage, if the second detection voltage is higher than the second specified input voltage, to adjust the pulse duty of the PWM voltage in accordance with a difference voltage between the second detection voltage and the second specified input voltage and to control the current flowing through the motor so as to be equal to the target current.

The motor drive control apparatus of the present invention compares the specified input voltage that is externally supplied with the detection voltage indicating the average current flowing thorough the motor. If the detection voltage is lower than or equal to the specified input voltage, the current flowing through the motor is within a normal control range. Accordingly, as in the control of the average current flowing through the motor in the motor drive control apparatus of this type, the PWM voltage is supplied for controlling the first switching element and the ON voltage, which is turned on at least during the ON period of the PWM voltage, is supplied for controlling the second switching element to adjust the pulse duty of the PWM voltage such that the average current flowing through the motor is equal to a predetermined value. If the detection voltage is higher than the specified input voltage, the current flowing through the motor is without the normal control range. Accordingly, the OFF voltage is supplied for controlling the first switching element connected to the power supply and the PWM voltage is supplied for controlling the second switching element connected to the reference voltage point to apply only a driving current based on the electromotive force of the motor as the current flowing through the motor. Since the pulse duty of the PWM voltage is adjusted to set the average current flowing through the motor to a predetermined value, the driving current for the motor can always be set to the predetermined value.

The motor drive control apparatus of the present invention always sets the current flowing through the motor to a predetermined value. Accordingly, since the motor torque does not exceed a predetermined value, the operation member coupled to the motor can be manually operated with a superior operation sense.

Further features and advantages of the present invention will become apparent from the following description of exemplary embodiments with reference to the attached drawings.

DESCRIPTION OF THE PREFERRED EMBODIMENTS

Embodiments of the present invention will be described below with reference to the attached drawings.

Figures 1, 2:
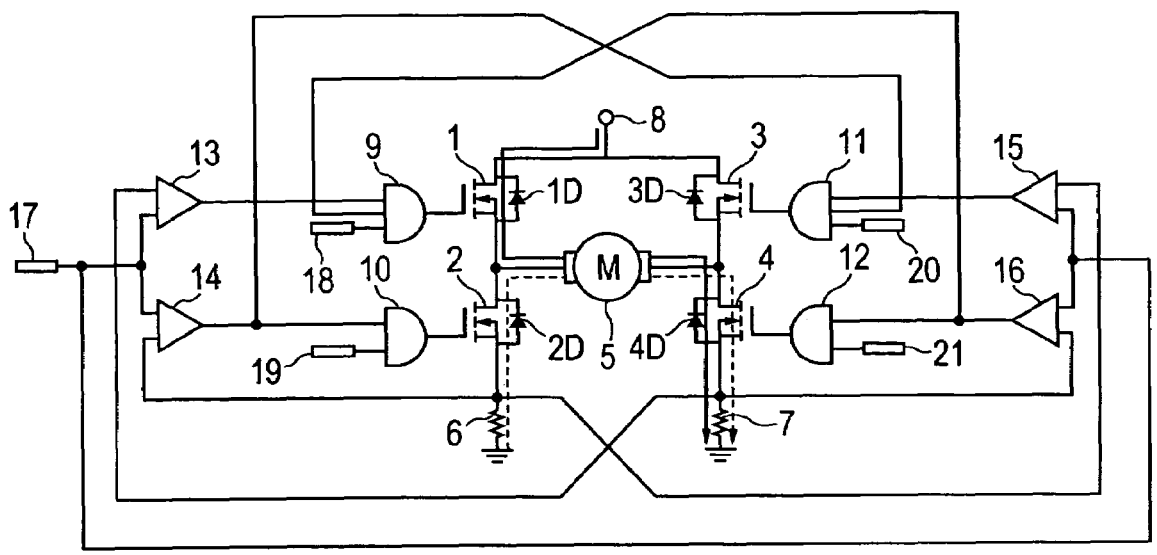
FIG. 1 is a circuit diagram showing the structure of the main part of a motor drive control apparatus according to an embodiment of the present invention.
FIG. 2 is a table showing the operation states of switching elements from a first switching element to a fourth switching element and the relationship between a specified voltage Vi and a first detection voltage $V_{F1}$ or a second detection voltage $V_{F2}$, in the motor drive control apparatus shown in FIG. 1.

FIG. 1 is a circuit diagram showing the structure of the main part of a motor drive control apparatus according to an embodiment of the present invention.

Referring to FIG. 1, the motor drive control apparatus according to this embodiment includes a first switching element 1, a second switching element 2, a third switching element 3, a fourth switching element 4, a first free-wheeling diode 1D, a second free-wheeling diode 2D, a third free-wheeling diode 3D, a fourth free-wheeling diode 4D, a DC motor 5, a first current-detection resistor 6, a second current-detection resistor 7, a power terminal 8, a first AND gate 9, a second AND gate 10, a third AND gate 11, a fourth AND gate 12, a first comparator 13, a second comparator 14, a third comparator 15, a fourth comparator 16, a specified-voltage input terminal 17, a first logical-signal input terminal 18, a second logical-signal input terminal 19, a third logical-signal input terminal 20, and a fourth logical-signal input terminal 21.

Figure 3:
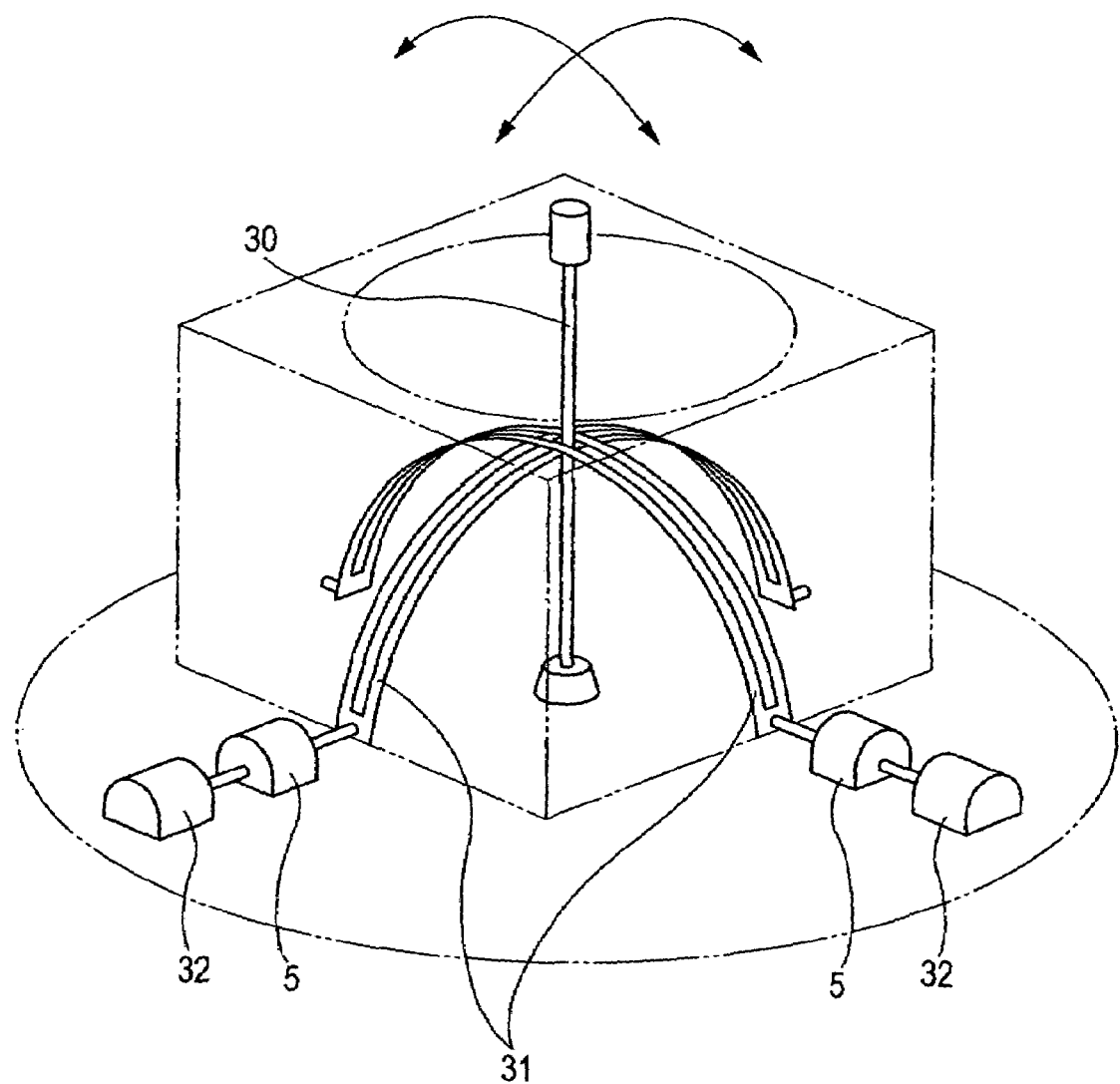
FIG. 3 is a perspective view showing the structure of a joystick input apparatus that has a function of giving a force sense and that is provided with the motor drive control apparatus in FIG. 1.
Figure 4:
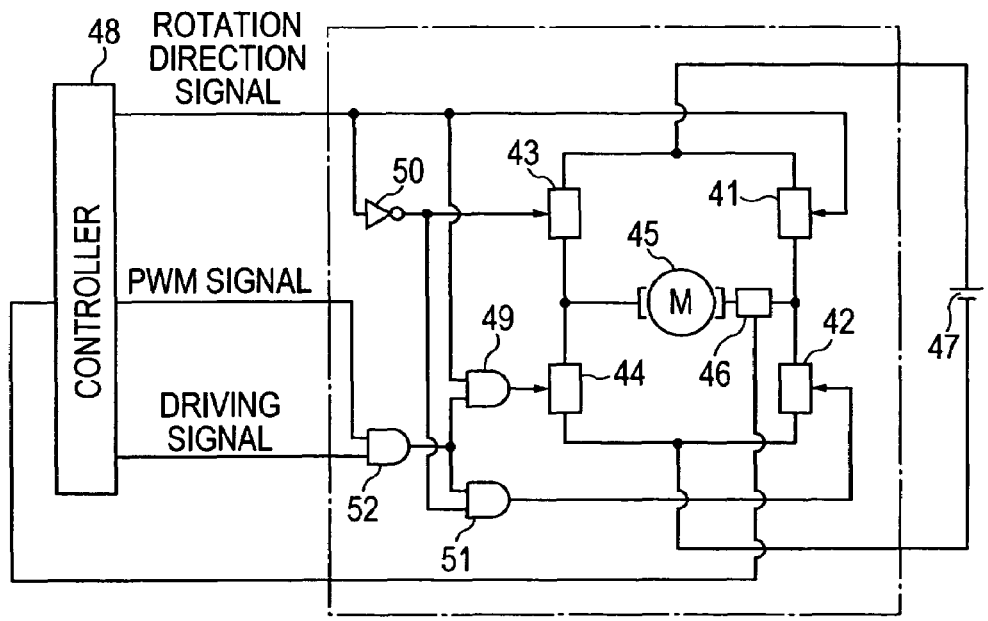
FIG. 4 is a circuit diagram showing the configuration of a motor drive circuit disclosed in Japanese Unexamined Patent Application Publication No. 11-243696.
Figure 5:
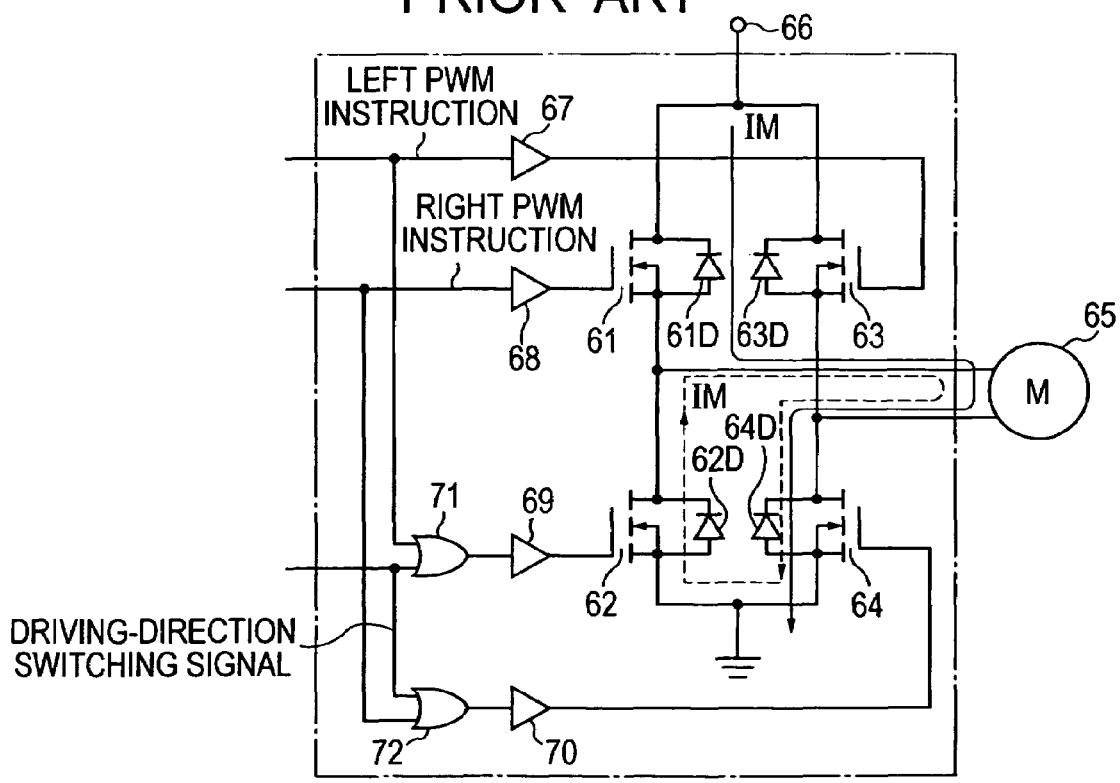
FIG. 5 is a circuit diagram showing the configuration of a motor drive circuit disclosed in Japanese Unexamined Patent Application Publication No. 11-215876.
Figure 6:
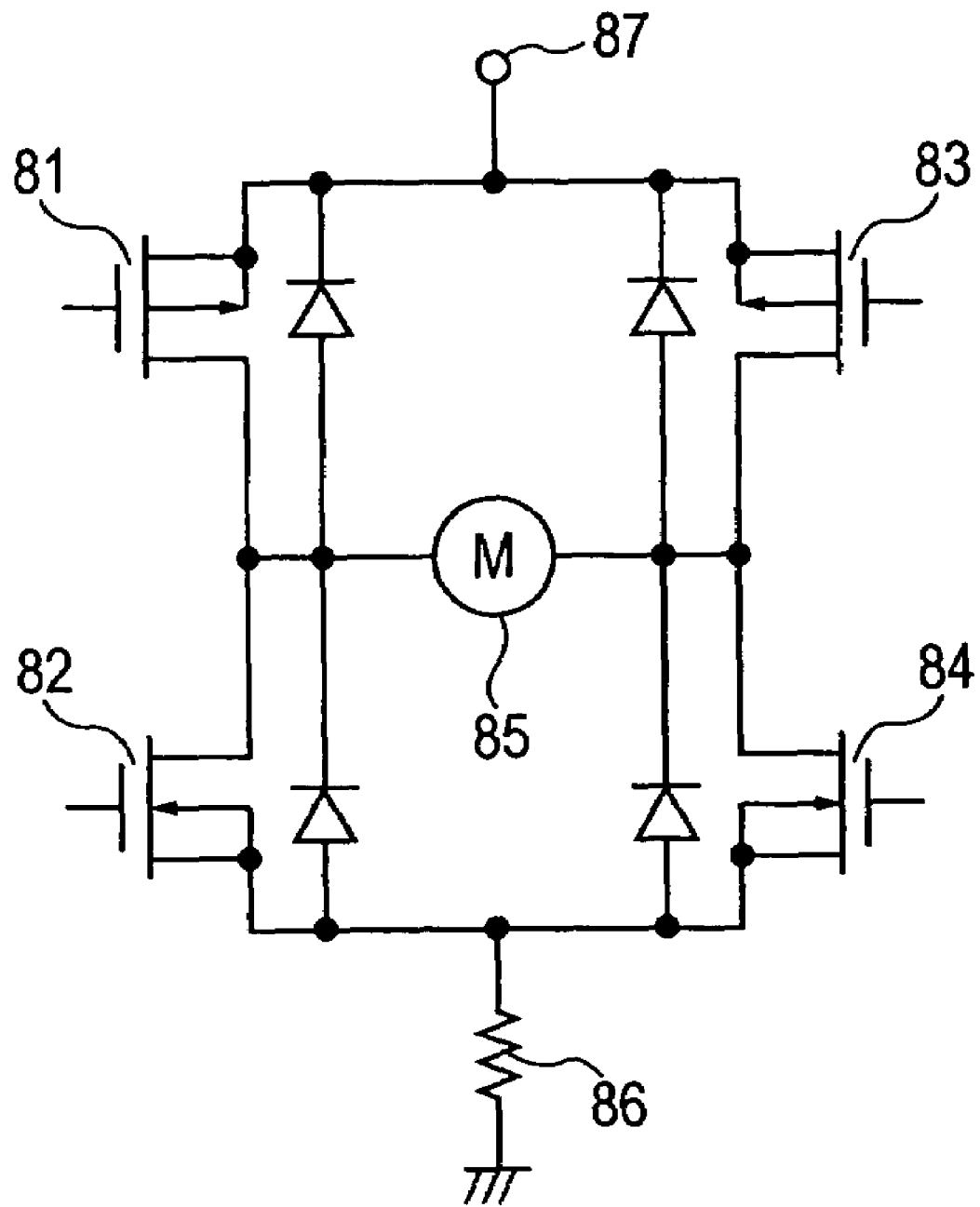
FIG. 6 is a circuit diagram showing the configuration of a motor drive circuit disclosed in Japanese Unexamined Patent Application Publication No. 06-237591.

FIG. 3 is a perspective view of a joystick input apparatus that has a function of giving a force sense and that has a pair of the DC motors 5 provided therein. The axes of rotation of the DC motors 5 are integrally coupled with the axes of rotation of the corresponding interlocking members 31. An operation member 30 is inserted through grooves of the interlocking members 31 and is held in the interlocking members 31 so as to be capable of tilting. The motor drive control apparatus described above and a rotation-angle detector 32 are connected to each of the DC motors 5. When the operation member 30 is tilted at an arbitrary angle in accordance with, for example, the position of a cursor on a display, a predetermined force corresponding to the position of the cursor is applied from the DC motor 5 to the operation member 30 through the corresponding interlocking member 31 and the operator feels a sense of click or a sense of a large actuating force or a small actuating force.

Although the axes of rotation of the DC motors 5 are integrally coupled with the axes of rotation of the corresponding interlocking members 31, a known power transmission mechanism in which, for example, gears are provided around the axes of rotation of the interlocking members 31 and gears engaged with the gears around the axes of rotation of the interlocking members 31 are provided around the axes of rotation of the DC motors 5 may be adopted. The operation member 30 may be held by using the structure of a known joystick, in which structure the operation member 30 is held in one of the interlocking members 31.

A motor drive circuit in the motor drive control apparatus in FIG. 1 will now be described.

The first switching element 1, the second switching element 2, and the first current-detection resistor 6 are connected in series between the power terminal 8 and a ground point. The third switching element 3, the fourth switching element 4, and the second current-detection resistor 7 are connected in series between the power terminal 8 and the ground point. The first diode 1D is connected in parallel to the first switching element 1, the second diode 2D is connected in parallel to the second switching element 2, the third diode 3D is connected in parallel to the third switching element 3, and the fourth diode 4D is connected in parallel to the fourth switching element 4. The DC motor 5 is connected between the connection point between the first switching element 1 and the second switching element 2 and the connection point between the third switching element 3 and the fourth switching element 4. The switching elements from the first switching element 1 to the fourth switching element 4, the free-wheeling diodes from the first diode 1D to the fourth diode 4D, and the components from the DC motor 5 to the power terminal 8 form an H-bridge circuit.

A first input of the first AND gate 9 is connected to the output of the first comparator 13, a second input thereof is connected to the output of the fourth comparator 16, and a third input thereof is connected to the first logical-signal input terminal 18. The output of the first AND gate 9 is connected to the gate of the first switching element 1. A first input of the second AND gate 10 is connected to the output of the second comparator 14 and a second input thereof is connected to the second logical-signal input terminal 19. The output of the second AND gate 10 is connected to the gate of the second switching element 2. A first input of the third AND gate 11 is connected to the output of the third comparator 15, a second input thereof is connected to the output of the second comparator 14, and a third input thereof is connected to the third logical-signal input terminal 20. The output of the third AND gate 11 is connected to the gate of the third switching element 3. A first input of the fourth AND gate 12 is connected to the output of the fourth comparator 16 and a second input thereof is connected to the fourth logical-signal input terminal 21. The output of the fourth AND gate 12 is connected to the gate of the fourth switching element 4. A first input of the first comparator 13 is connected to the non-ground terminal of the second current-detection resistor 7 and a second input thereof is connected to the specified-voltage input terminal 17. A first input of the second comparator 14 is connected to the specified-voltage input terminal 17 and a second input thereof is connected to the non-ground terminal of the first current-detection resistor 6. A first input of the third comparator 15 is connected to the non-ground terminal of the first current-detection resistor 6 and a second input thereof is connected to the specified-voltage input terminal 17. A first input of the fourth comparator 16 is connected to the specified-voltage input terminal 17 and a second input thereof is connected to the non-ground terminal of the second current-detection resistor 7.

The first current-detection resistor 6 detects a negative current flowing through the DC motor 5 when the DC motor 5 rotates in the negative direction, for example, leftward. The negative current corresponds to a first detection voltage $V_{F1}$ at the non-ground terminal of the first current-detection resistor 6. The second current-detection resistor 7 detects a positive current flowing through the DC motor 5 when the DC motor 5 rotates in the positive direction, for example, rightward. The positive current corresponds to a second detection voltage $V_{F2}$ at the non-ground terminal of the second current-detection resistor 7. A specified voltage Vi is externally applied to the specified-voltage input terminal 17. The specified voltage Vi is used to set a target average current $i_T$ flowing through the DC motor 5. The target average current $i_T$ is set in advance in accordance with the position or speed of the operation member 30, or in accordance with both of the position and speed of the operation member 30.

The operation of the motor drive control apparatus having the structure described above when the DC motor 5 rotates in the positive direction, that is, when the positive current shown by a solid line flows through the DC motor 5, will now be described.

In order to rotate the DC motor 5 in the positive direction, the specified voltage Vi is applied to the specified-voltage input terminal 17 and ON signals are supplied to the first switching element 1 and the fourth switching element 4 to turn on the first switching element 1 and the fourth switching element 4. OFF signals are supplied to the second switching element 2 and the third switching element 3 to turn off the second switching element 2 and the third switching element 3. A positive current flows from the power terminal 8 to the ground point through the first switching element 1, the DC motor 5, the fourth switching element 4, and the second current-detection resistor 7. That is, the positive current indicated by the solid line flows through the DC motor 5 to rotate the DC motor 5 in the positive direction. The positive current flowing through the second current-detection resistor 7 generates the second detection voltage $V_{F2}$ at the non-ground point of the second current-detection resistor 7.

The specified voltage Vi supplied to the specified-voltage input terminal 17 and the second detection voltage $V_{F2}$ detected at the second current-detection resistor 7 are supplied to the first comparator 13 and the fourth comparator 16, and the output from the first comparator 13 is supplied to the first AND gate 9 and the output from the fourth comparator 16 is supplied to the fourth AND gate 12. If the specified voltage Vi is higher than or equal to the second detection voltage $V_{F2}$ (Vi≧$V_{F2}$) in this operation, a PWM signal is supplied from the first AND gate 9 to the first switching element 1 and the ON signal is supplied from the fourth AND gate 12 to the fourth switching element 4. The pulse duty of the PWM signal is appropriately adjusted in accordance with the specified voltage Vi to control the average positive current flowing through the DC motor 5 so as to be equal to the target average current $i_T$.

When a large force is not applied, that is, when the specified voltage Vi is set to a small value in the above operation, for example, in the case of the operation member 30 that is positioned at the center, the operation member 30 coupled with the axes of rotation of the DC motors 5 is liable to be manually operated at a high speed. A large electromotive force is generated along with the rotation of the axis of rotation of the DC motors 5. The average positive current flowing through the DC motor 5 is excessively increased due to the large electromotive force to satisfy Vi<$V_{F2}$, instead of the Vi≧$V_{F2}$. In this case, even when the pulse duty of the PWM signal supplied from the first AND gate 9 to the first switching element 1 is set to 0%, that is, the OFF signal is supplied to the first switching element 1 to turn off the first switching element 1, the positive current caused by the large electromotive force flows through the DC motor 5 in the direction indicated by a broken line and the DC motor 5 continues to generate the positive torque.

In this operation, the OFF signal is supplied from the first AND gate 9 to the first switching element 1 to turn off the first switching element 1, and the PWM signal is supplied from the fourth AND gate 12 to the fourth switching element 4 to turn on or off the fourth switching element 4 in accordance with the pulse duty of the PWM signal. The pulse duty of the PWM signal is appropriately adjusted in accordance with the specified voltage Vi to control the average positive current flowing through the DC motor 5 so as to be equal to the target average current $i_T$.

In contrast, in the operation performed when the negative current flows through the DC motor 5 to rotate the DC motor 5 in the negative direction, the second switching element 2 and the third switching element 3 are turned on and the first switching element 1 and the fourth switching element 4 are turned off, instead of turning on of the first switching element 1 and the fourth switching element 4 and turning off of the second switching element 2 and the third switching element 3.

If the specified voltage Vi is higher than or equal to the first detection voltage $V_{F1}$ (Vi≧$V_{F1}$) in this operation, the PWM signal is supplied from the third AND gate 11 to the third switching element 3 and the ON signal is supplied from the second AND gate 10 to the second switching element 2. The pulse duty of the PWM signal is appropriately adjusted in accordance with the specified voltage Vi to control the average negative current flowing through the DC motor 5 so as to be equal to the target average current $i_T$.

If the specified voltage Vi is lower than the first detection voltage $V_{F1}$ (Vi<$V_{F1}$), instead of satisfying the Vi≧$V_{F1}$, in this operation for the reason described above, the negative current caused by the large electromotive force flows through the DC motor 5 and the DC motor 5 continues to generate the negative torque even when the pulse duty of the PWM signal supplied from the third AND gate 11 to the third switching element 3 is set to 0% to turn off the third switching element 3.

In this operation, the OFF signal is supplied from the third AND gate 11 to the third switching element 3 to turn off the third switching element 3, and the PWM signal is supplied from the second AND gate 10 to the second switching element 2 to turn on or off the second switching element 2 in accordance with the pulse duty of the PWM signal. The pulse duty of the PWM signal is appropriately adjusted in accordance with the specified voltage Vi to control the average negative current flowing through the DC motor 5 so as to be equal to the target average current $i_T$.

FIG. 2 is a table showing the operations described above in the motor drive control apparatus shown in FIG. 1. The table in FIG. 2 shows the operation states of the switching elements from the first switching element 1 to the fourth switching element 4 and the relationship between the specified voltage Vi and the first detection voltage $V_{F1}$ or the second detection voltage $V_{F2}$.

As shown in FIG. 2, in the positive rotation of the DC motor 5, if Vi≧$V_{F2}$, the first switching element 1 is driven with the PWM signal, the second switching element 2 is driven with the OFF signal, the third switching element 3 is driven with the OFF signal, and the fourth switching element 4 is driven with the ON signal. If Vi<$V_{F2}$, the first switching element 1 is driven with the OFF signal, the second switching element 2 is driven with the OFF signal, the third switching element 3 is driven with the OFF signal, and the fourth switching element 4 is driven with the PWM signal. In the negative rotation of the DC motor 5, if Vi≧$V_{F2}$, the first switching element 1 is driven with the OFF signal, the second switching element 2 is driven with the ON signal, the third switching element 3 is driven with the PWM signal, and the fourth switching element 4 is driven with the OFF signal. If Vi<$V_{F2}$, the first switching element 1 is driven with the OFF signal, the second switching element 2 is driven with the PWM signal, the third switching element 3 is driven with the OFF signal, and the fourth switching element 4 is driven with the OFF signal.

As described above, the motor drive control apparatus according to the embodiment of the present invention can control the average positive current or the average negative current, flowing through the DC motor 5, so as to be equal to the target average current $i_T$ not only when the electromotive force of the DC motor 5 is equal to zero or is very small and the specified voltage Vi is higher than or equal to the first detection voltage $V_{F1}$ or the second detection voltage $V_{F2}$ (Vi≧$V_{F1}$ or Vi≧$V_{F2}$) but also when the target average current is small or the electromotive force of the DC motor 5 is very large and the specified voltage Vi is lower than the first detection voltage $V_{F1}$ or the second detection voltage $V_{F2}$ (Vi<$V_{F1}$ or Vi<$V_{F2}$). Hence, the motor torque of the DC motor 5 can be set to a predetermined value and, thus, the operation member 30 coupled with the DC motor 5 can be manually operated with a superior operation sense.

Although the first switching element 1 is driven with the PWM signal and the fourth switching element 4 is always turned on when the Vi≧$V_{F2}$, according to the embodiment of the present invention, the first switching element 1 may always be turned on and the fourth switching element 4 may be driven with the PWM signal. Alternatively, the first switching element 1 and the fourth switching element 4 may be driven with the PWM signal such that at least the fourth switching element 4 is turned on during the ON period of the first switching element 1. The same applies to the second switching element 2 and the third switching element 3 when Vi≧$V_{F1}$. That is, the third switching element 3 may always be turned on and the second switching element 2 may be driven with the PWM signal. Alternatively, the third switching element 3 and the second switching element 2 may be driven with the PWM signal such that at least the second switching element 2 is turned on during the ON period of the third switching element 3.

Although the motor drive control apparatus according to the embodiment of the present invention uses the H-bridge circuit including the switching elements from the first switching element 1 to the fourth switching element 4 in order to rotate and drive the DC motor 5, only the first switching element 1 and the fourth switching element 4 may be used and the second switching element 2 and the third switching element 3 may be omitted, or only the second switching element 2 and the third switching element 3 may be used and the first switching element 1 and the fourth switching element 4 may be omitted, when it is enough to always rotate the DC motor 5 only in one direction. In such cases, the control elements associated with the omitted switching elements, for example, the AND gates or the comparators associated with the omitted switching elements, are also omitted.

It will be further understood by those skilled in the art that the foregoing description is of the preferred embodiments of the present invention and that various changes and modifications may be made to the invention without departing from the spirit and scope thereof.

What is claimed is:

1. A motor drive control apparatus comprising:
   a motor;
   a power supply;
   a control circuit;
   a first current detector;

a first switching element, a first main electrode of which is connected to the power supply and a second main electrode of which is connected to one end of the motor, a first control voltage being supplied from the control circuit to a control electrode of the first switching element; and a second switching element, a first main electrode of which is connected to another end of the motor and a second main electrode of which is connected to a reference voltage point via the first current detector, a second control voltage being supplied from the control circuit to a control electrode of the second switching element, wherein the first current detector generates a first detection voltage indicating a first current flowing through the motor in one direction, wherein the first detection voltage and a first specified input voltage are applied to the control circuit, and wherein the control circuit generates a PWM voltage as one of the first control voltage and the second control voltage and generates an ON voltage, which is turned on at least during an ON period of the PWM voltage, as the other voltage of the first control voltage and the second control voltage, if the first detection voltage is lower than or equal to the first specified input voltage, and the control circuit generates an OFF voltage as the first control voltage and generates the PWM voltage as the second control voltage, if the first detection voltage is higher than the first specified input voltage, to adjust a pulse duty of the PWM voltage in accordance with a difference voltage between the first detection voltage and the first specified input voltage and to control the current flowing through the motor so as to be equal to a target current.

2. The motor drive control apparatus according to claim 1, further comprising:

a second current detector;

a third switching element, a first main electrode of which is connected to the power supply and a second main electrode of which is connected to the other end of the motor, a third control voltage being supplied from the control circuit to a control electrode of the third switching element; and a fourth switching element, a first main electrode of which is connected to one end of the motor and a second main electrode of which is connected to the reference voltage point via the second current detector, a fourth control voltage being supplied from the control circuit to a control electrode of the fourth switching element, wherein the second current detector generates a second detection voltage indicating a second current flowing through the motor in the other direction, wherein the second detection voltage and a second specified input voltage are applied to the control circuit, and wherein the control circuit generates the PWM voltage as one of the third control voltage and the fourth control voltage and generates the ON voltage, which is turned on at least during the ON period of the PWM voltage, as the other voltage of the third control voltage and the fourth control voltage, if the second detection voltage is lower than or equal to the second specified input voltage, and the control circuit generates the OFF voltage as the third control voltage and generates the PWM voltage as the fourth control voltage, if the second detection voltage is higher than the second specified input voltage, to adjust the pulse duty of the PWM voltage in accordance with a difference voltage between the second detection voltage and the second specified input voltage and to control the current flowing through the motor so as to be equal to the target current.

3. The motor drive control apparatus according to claim 1, wherein an operation member that is capable of being manually operated is coupled to an axis of rotation of the motor, and wherein a force sense corresponding to an amount of operation is provided when the operation member is manually operated.

* * * * *